(12) United States Patent
Caldwell et al.

(10) Patent No.: US 10,417,283 B2
(45) Date of Patent: *Sep. 17, 2019

(54) IDENTIFICATION OF POTENTIALLY SENSITIVE INFORMATION IN DATA STRINGS

(71) Applicant: SecurityMetrics, Inc., Orem, UT (US)

(72) Inventors: Bradley R. Caldwell, Orem, UT (US); Alan B. Butt, Orem, UT (US)

(73) Assignee: Securitymetrics, Inc., Orem, UT (US)

( * ) Notice: Subject to any disclaimer, the term of this patent is extended or adjusted under 35 U.S.C. 154(b) by 217 days.

This patent is subject to a terminal disclaimer.

(21) Appl. No.: 15/650,575

(22) Filed: Jul. 14, 2017

(65) Prior Publication Data
US 2018/0018404 A1    Jan. 18, 2018

Related U.S. Application Data

(60) Provisional application No. 62/362,039, filed on Jul. 14, 2016.

(51) Int. Cl.
| | |
|---|---|
| G06F 21/00 | (2013.01) |
| G06F 16/903 | (2019.01) |
| G06F 21/62 | (2013.01) |
| G06Q 20/40 | (2012.01) |
| G06F 9/448 | (2018.01) |

(52) U.S. Cl.
CPC .... *G06F 16/90344* (2019.01); *G06F 21/6245* (2013.01); *G06Q 20/4016* (2013.01); *G06F 9/4493* (2018.02)

(58) Field of Classification Search
CPC .......... G06F 16/90344; G06F 21/6245; G06F 9/4493; G06Q 20/4016
See application file for complete search history.

(56) References Cited

U.S. PATENT DOCUMENTS

| | | | |
|---|---|---|---|
| 7,328,430 B2 | 2/2008 | Fairweather | |
| 8,256,006 B2 | 8/2012 | Grzymala-Busse et al. | |
| 8,407,261 B2 | 3/2013 | Koyanagi et al. | |
| 8,608,063 B2 * | 12/2013 | Butt | G06F 16/90344 235/380 |

(Continued)

OTHER PUBLICATIONS

International Search Report, International application No. PCT/US11/38632, dated Sep. 29, 2011.

(Continued)

*Primary Examiner* — Brandon S Hoffman
*Assistant Examiner* — William A Corum, Jr.
(74) *Attorney, Agent, or Firm* — Durham Jones & Pinegar, P.C., Intellectual Property Law Group

(57) ABSTRACT

Methods for identifying potentially sensitive information and protecting such potentially sensitive information include scanning systems that collect and/or disseminate such information. Without limitation, systems collect and/or disseminate personal identification numbers (e.g., personal identification numbers, tax identification numbers, etc.), such as merchant systems, bank systems, healthcare systems, and the like, that collect, use, or disseminate sensitive information may be scanned to identify sequences of data that are likely to be sensitive, and may take actions to protect such sequences of data. Scanning and protection systems are also disclosed.

11 Claims, 4 Drawing Sheets

(56) References Cited

U.S. PATENT DOCUMENTS

| | | | |
|---|---|---|---|
| 8,616,443 B2 * | 12/2013 | Butt | G06F 16/90344 235/380 |
| 2002/0112167 A1 | 8/2002 | Boneh et al. | |
| 2003/0140007 A1 | 7/2003 | Kramer et al. | |
| 2007/0276765 A1 | 11/2007 | Hazel et al. | |
| 2008/0040275 A1 | 2/2008 | Paulsen et al. | |
| 2008/0126301 A1 | 5/2008 | Bank et al. | |
| 2008/0216174 A1 | 9/2008 | Vogel et al. | |
| 2009/0138329 A1 | 5/2009 | Wanker | |
| 2009/0282039 A1 | 11/2009 | Diamond | |
| 2009/0289112 A1 | 11/2009 | Bonalle et al. | |
| 2009/0310778 A1 | 12/2009 | Mueller et al. | |
| 2010/0012589 A1 | 1/2010 | Ribault et al. | |
| 2010/0050249 A1 | 2/2010 | Newman | |
| 2010/0088305 A1 * | 4/2010 | Fournier | G06F 21/552 707/706 |
| 2010/0106611 A1 | 4/2010 | Paulsen et al. | |
| 2011/0040983 A1 | 2/2011 | Grzymala-Busse et al. | |
| 2012/0016896 A1 * | 1/2012 | Butt | G06F 16/90344 707/758 |
| 2012/0023117 A1 * | 1/2012 | Butt | G06F 16/90344 707/758 |

OTHER PUBLICATIONS

Written Opinion, International application No. PCT/US11/38632, dated Sep. 29, 2011.
International Preliminary Examination Report, International application No. PCT/US11/38632, dated Apr. 12, 2012.
Preliminary Examination Report, British application No. GB1711333.3, dated Sep. 22, 2017.
Preliminary Examination Report, British application No. GB1711333.3, dated Nov. 22, 2017.
Combined Search and Examination Report, British application No. GB1711333.3, dated Jan. 4, 2018.
Baeza-Yates, R.A., et al., "Fast Text Searching for Regular Expressions of Automation Searching on Tries," J. of the ACM, 43(6):915-936 (Nov. 1996).

* cited by examiner

IDENTIFICATION OF POTENTIALLY SENSITIVE INFORMATION IN DATA STRINGS

CROSS-REFERENCE TO RELATED APPLICATION

A claim for priority to the Jul. 14, 2016 filing date of U.S. Provisional Patent Application No. 62/362,039, titled IDENTIFICATION OF POTENTIAL SENSITIVE INFORMATION IN DATA STRINGS ("the '039 Provisional Application") is hereby made pursuant to 35 U.S.C. § 119(e). The entire disclosure of the '039 Provisional Application is hereby incorporated herein.

TECHNICAL FIELD

This disclosure relates generally to the protection of sensitive information. More specifically, this disclosure relates to the protection of personal identification numbers, including, without limitation, government-issued identification numbers. Even more specifically, methods for scanning systems that collect and disseminate sensitive information (e.g., merchant systems, bank systems, etc., that collect, use, or disseminate sensitive information) for any such sensitive information are disclosed.

RELATED ART

Sensitive, personally-identifying information is often used for an individual to identify himself or herself. In some contexts, an individual must provide his or her personally-identifying information to prove his or her identity. For example, in the United States of America (U.S.), an individual must provide a Social Security Number (SSN) or an Individual Taxpayer Identification Number (ITIN) to open bank accounts and other types of financial accounts, to receive credit, to open various types of accounts, to apply for and receive insurance, to receive healthcare, to take standardized tests, to enroll in post-secondary schooling (e.g., college, university, etc.), to start a job, and to pay taxes. Equivalent information is often required under at least some of these circumstances, and others, in other jurisdictions. For example, a Tax File Number (TFN) may be required for a number or reasons in Australia, a Social Insurance Number (SIN) may be required for a variety of reasons in Canada, and a National Insurance Number (NINO) may be required for various purposes in the United Kingdom.

Usually when a personal identification number is required, it is entered into a computer system (e.g., a computer system operated by a healthcare provider, a computer system operated by a merchant, a computer system operated by a bank, a computer system operated by an educational institution, a computer system operated by an employer, a computer system operated by a branch of the government, etc.). Sometimes the information is stored in memory associated with the processing equipment. That information may be stored in groups that include long strings of data.

Due to the highly personal nature of personal identification numbers, the access they provide to information, and the sensitive nature of the information associated with them, personal identification numbers are often highly coveted and targeted by identity thieves. Identity thieves have been creative in their efforts to obtain personal identification numbers, and have resorted to a large number of different techniques to get them. One of the ways identity thieves attempt to obtain personal identification numbers is by accessing (usually illegally) and mining the memories of computer systems that collect, use, and/or disseminate personal identification numbers. These include, without limitation, the computer systems of healthcare providers, the computer systems of merchants, banks, and bank card companies, and the computer systems of educational institutions, businesses, and governments.

SUMMARY

In one aspect, techniques for identifying, or recognizing, sensitive information on memory associated with a computer system that collects, uses, and/or disseminates the sensitive information are disclosed. More specifically, a technique according to this disclosure includes identification of a personal identification number on memory associated with a computer system that collects, uses, and/or disseminates the personal identification number. Such a technique may also include removal of sensitive information, such as a personal identification number, from the memory on which the sensitive information is identified.

One embodiment of such a method includes an "interval scanning" technique, in which a string of data is evaluated in intervals. When such a method is used, data is evaluated by analyzing bytes of data in periodic sequence (e.g., every sixth byte, every ninth byte, every thirteenth byte, etc., for UTF 8 (8 bit Unicode Transformation Format) encoding, two sequential bytes of every twelve bytes, every eighteen bytes, every twenty-six bytes, etc., for UTF 16 (16 bit Unicode Transformation Format) encoding, four sequential bytes of every twenty-four bytes, every thirty-six bytes, every fifty-two bytes, etc., for UTF 32 (32 bit Unicode Transformation Format) encoding, byte, etc.), while the bytes between the analyzed bytes are initially ignored. Searching may be "ordinal" (e.g., one byte searching, then two byte searching (both little endian (LE) and big endian (BE)), then four byte searching (both LE and BE), etc.) to enable the search algorithm to identify data of interest across a plurality of, or regardless of the particular type of, format in which the data may be encoded (e.g., UTF 8, UTF 16LE, UTF 16BE, UTF 32LE, UTF 32BE). If the value of an analyzed byte or group bytes (two adjacent bytes in UTF 16 encoding, four adjacent bytes in UTF 32 encoding, etc.; for the sake of simplicity, the term "byte," as used herein, includes a single byte in UTF 8 encoding, an adjacent pair of bytes in UTF 16 encoding, and an adjacent set of four bytes in UTF 32 encoding) corresponds to a character of interest (e.g., a decimal numeral or numeric digit (i.e., a character having a value that corresponds to a base ten, or Arabic, number, 0, 1, 2, 3, 4, 5, 6, 7, 8, or 9), a dash (-) or a space, etc.), that byte is identified as a "base byte," from which a more focused evaluation (e.g., a byte-by-byte analysis, or sequential analysis, etc.) may then commence. In the sequential analysis, bytes adjacent to both "sides" of the base byte are analyzed to determine whether or not their values also correspond to characters of interest (e.g., decimal numerals, dashes and/or spaces, etc.). The sequential analysis may continue until a determination is made that the number of sequential bytes that correspond to characters of interest (e.g., decimal numerals, etc.) is too short (e.g., <6 digits, <9 digits, <13 digits, etc.) or too long (e.g., >6 digits, >11 digits and dashes or spaces, >19 digits and dashes or spaces, etc.) to comprise the sensitive information of interest (e.g., a personal identification number, an account number for a payment card, etc.).

If the number of sequential bytes that correspond to characters of interest (e.g., decimal numerals, dashes or spaces, etc.) is too long or too short to comprise the sensitive information of interest (e.g., a personal identification number, an account number for a payment card, etc.), the process may be repeated. In particular, interval searching may recommence from the base byte or from any other byte analyzed during the sequential search until another byte that corresponds to a character of interest (e.g., a decimal numeral, a dash or space, etc.) is identified. At that point, identification of one or more additional base bytes and further sequential searching may be repeated.

If, in the alternative, the sequential analysis reveals a number of sequential bytes that correspond to characters of interest (e.g., decimal numbers and dashes or spaces, etc.), in some embodiments, a determination may be made as to whether or not the arrangement of sequential bytes corresponds to an acceptable arrangement for the sensitive information of interest (e.g., DDDDDDDDD, DDD-DDD-DDD, DDD-DD-DDDD, DDD DDD DDD, DDD DD DDDD, etc., for a personal identification number; DDDDDDDDDDDDDDDD, DDDD-DDDDDD-DDDDD, DDDD DDDDDD DDDDD, DDDDDDDDDDDDDDDD, DDDD-DDDD-DDDD-DDDD, DDDD DDDD DDDD DDDD, etc., for an account number for a payment card; etc.).

In other embodiments, if the sequential analysis reveals a number of sequential bytes that correspond to characters of interest, a supplemental sequential analysis may be conducted to determine whether or not bytes that precede and/or follow the sequential bytes correspond to other characters of interest (e.g., combinations of letters of the alphabet, specific letters of the alphabet, etc.). As an example, if the initial sequential reveals a sequence of bytes that corresponds to a six digit number, the supplemental sequential analysis may determine whether or not the six digit number is preceded by two letters of the alphabet and/or followed by a single acceptable letter of the alphabet.

A sequence of bytes with characters of interest (e.g., decimal numerals, etc.) having a length or a number of characters that may correspond to potentially sensitive information (e.g., a possible personal identification number, a possible account number for a payment card, etc.) may be identified as a "tagged string." Further analysis of the tagged string of data may ensue, either immediately or after an entire group of data has been analyzed (by more interval searching, tagging, and sequential searching) for more potential sensitive information.

Once potentially sensitive information (e.g., a personal identification number, an account number for a payment card, etc.) has been identified, for example, in the manner described above or by any other suitable technique known in the art (e.g., evaluating all of the bytes in a group of data, etc.), a delimiter search may be conducted. A delimiter search includes an evaluation of the bytes adjacent to the beginning and end of the string of bytes that correspond to a tagged string of data. Searching for and/or evaluation of known delimiters may be "ordinal" (e.g., one byte searching, then two byte searching (both LE and BE), then four byte searching (both LE and BE), etc.) to enable the search algorithm to identify data of interest across a plurality of UTFs, or regardless of the particular type of UTF, in which the data may be encoded (e.g., UTF 8, UTF 16LE, UTF 16BE, UTF 32LE, UTF 32BE). In various embodiments, a delimiter search includes evaluation of the adjacent bytes to determine whether or not they correspond to known delimiters (e.g., a comma (,), a tab ( ) a space, ( ) a slash (/ or \), etc.). Characters that are typically used in numeric sequences (e.g., a dash (-), a period (.), etc.) and strings (e.g., two or more sequential bytes, etc.) of alphabetic characters (e.g., names, etc.) may, in some embodiments, be considered not to comprise delimiters. A tagged string that is not surrounded by known delimiters may be disregarded (i.e., considered not to comprise sensitive information), while a tagged string that is surrounded by known delimiters may warrant further evaluation.

A tagged string that includes potentially sensitive information (e.g., a personal identification number, an account number for a payment card, etc.) may be evaluated to determine whether or not it includes (e.g., begins with, etc.) a known identifier of sensitive information (e.g., a known bank identification number (BIN), a combination of numbers that may be used in a personal identification number, such as a Social Security Number, a combination of letters that may be used in a personal identification number, such as a National Insurance Number, etc). Searches for and/or the evaluation of known identifiers of sensitive data may also be ordinal. A search for a known identifier that incorporates teachings of the present invention may include an analysis of a fixed number of bytes (e.g., two, three, four, six, etc.) in (e.g., at the beginning of, etc.) a tagged string. These bytes may be evaluated in a so called "trie" algorithm, in which a first byte is analyzed at a first node of the "trie." If the value of the first byte does not correspond to a first value present in a known identifier (e.g., a BIN, etc.), the known identifier search may be terminated and the tagged string is no longer considered to include potentially sensitive information. If, in the alternative, the value of the first byte does match with a corresponding first value of a known identifier, the search proceeds to a second node of the trie. The value of a second byte of the tagged string is then compared with one or more second values of a known identifier that also includes the first value (i.e., a database of a group of second values that are known to follow the identified first value in a group of known identifiers). Again, if the value of the second byte does not correspond to the second value of a known identifier, the search may be terminated and the tagged string may no longer be considered to comprise potentially sensitive information. If the value of the second byte corresponds to the second value of a known identifier, the process continues to a third node of the trie, where the process is repeated. If, following conclusion of the analysis, all of the evaluated bytes match a corresponding combination of values of a known identifier, the tagged string may be subjected to further analysis.

One or more of the evaluation processes of the present invention may be used to provide an increased level of confidence that the bytes of a particular data string correspond to characters of potentially sensitive information of interest. Any tagged strings that are unlikely to include the potentially sensitive information of interest may be disregarded. In some embodiments, the further evaluation comprises a much less intensive process and, thus, less time to complete, than a final process for verifying whether a data string actually includes sensitive information of interest. Thus, quicker processes may be used to disregard, or weed out, the majority of data within a group, while the more intensive final process may be reserved for data strings that are likely to include the sensitive information of interest.

In some embodiments, known processes may be used to verify that a tagged string includes potentially sensitive information (e.g., an account number for a payment card, etc.). In a specific embodiment, a known validation or "checksum" algorithm, such as the Luhn algorithm, may be used to determine whether or not a tagged string encodes an actual payment card account number or an actual personal identification number.

In another specific embodiment, a search may be conducted for a combination of place names within a predetermined number of bytes before and/or after a tagged string that includes potentially sensitive information. Such a search may include a search for the name of a town or a city in connection with the name or an identifier for a known corresponding name of a county, state or province. Such a search may be used to determine whether or not a tagged string of data encodes an actual personal identification number.

A system according to this disclosure may execute one or more of the processes that have been described above. The above described processes may be implemented in the form of a program that may be executed by processing element (e.g., computer processor, etc.) or that evaluates, or scans, stored data. The data may be stored in memory associated with the processing element, on in memory of a separate electronic device. The processing element may access the stored data by way of a suitable communication element, such as circuitry and/or wiring within the same electronic device (e.g., computer, etc.) as the processing element, a wired communication link between the electronic device of which the processing element is a part and a separate electronic device of which the memory is a part, or remotely (e.g., over an Internet connection, etc.).

Other aspects, as well as features and advantages of various aspects, of this disclosure will become apparent to those of ordinary skill in the art through consideration of the ensuing description, the accompanying drawings, and the appended claims.

DETAILED DESCRIPTION

Figure 4:
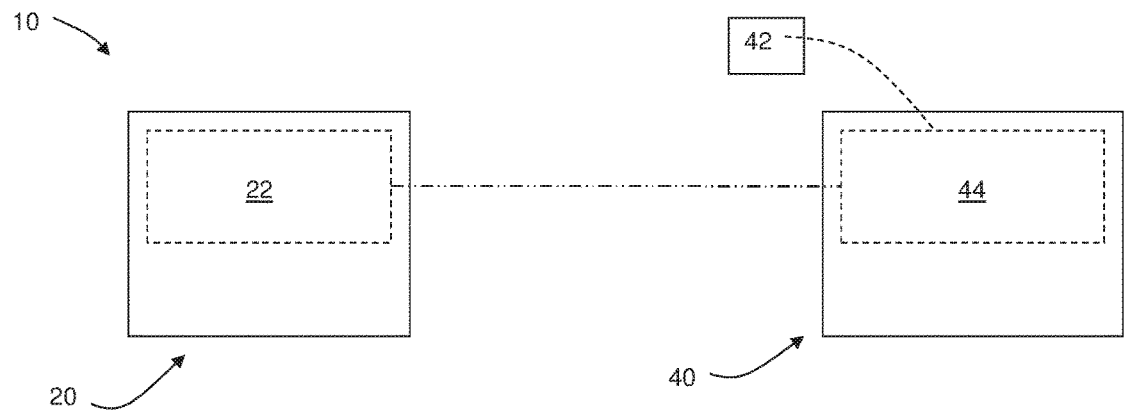
FIG. 4 is a schematic representation of an embodiment of an evaluation system, which includes a collection system and a scanning device for evaluating the collection system.

Various embodiments of systems for evaluating data to determine whether or not the data includes potentially sensitive information are described herein. FIG. 4 schematically depicts an embodiment of such an evaluation system 10, in which an electronic device, referred to here is a "scanning device 20," is configured to communicate with and scan data stored by a component of another electronic device that collects sensitive information, which is referred to herein as a "collection system 40."

The collection system 40 includes a memory device (e.g., a hard drive, etc.), or "memory 42" for the sake of simplicity, that stores data 44, which potentially includes sensitive information. In addition to memory 42, a collection system 40 of an evaluation system 10 of the present invention may include or be associated with a processing element 46, such as a microprocessor, a microcontroller, or the like.

The scanning device 20 is programmed to determine whether the data 44 stored by the memory 42 of the collection system 40 includes any potentially sensitive information. Programming of the scanning device 20, which may be in the form of software or firmware, controls operation of a processing element 22 of the scanning device 20. Some embodiments of processing elements 22 that may be included in a scanning device 20 of an evaluation system 10 of the present invention include, without limitation, microprocessors, microcontrollers, and elements that may be configured to execute a particular program. In embodiments where a scanning device 20 of an evaluation system 10 of the present invention is configured for direct connection to a collection system 40, the scanning device may be portable (e.g., a laptop computer; a hand-held computer, such as a so-called "smart phone," etc.; a dedicated scanner; etc.). In embodiments where a scanning device 20 is configured to remotely scan one or more collection systems 40, the scanning device 20 may comprise a server, or a device (e.g., a dedicated scanning device, a smart phone, etc.) that may connect remotely to the collection system 40 (e.g., through a cellular telephone data connection, etc.).

Communication between the memory 42 of the collection system 40 and a processing element 22 of the scanning device 20 may be established in any suitable manner known in the art. In embodiments where both the scanning device 20 and the collection system 40 comprise electronic devices, a communication link between the scanning device 20 and the collection system 40 may be direct or indirect. A direct connection may include a physical, or "wired," coupling between the scanning device 20 and the collection system, or it may include a close proximity wireless connection (e.g., a Bluetooth connection, a wireless local area network (WLAN) (e.g., a WiFi network operating in accordance with an IEEE 802.11 standard, etc.). An indirect connection may be established more remotely (e.g., over the Internet, etc.). In some embodiments where an indirect connection is established between the scanning device 20 and the collection system 40, the scanning device 20 of an evaluation system 10 that incorporates teachings of the present invention may be located at a central location, and may be configured to selectively communicate with a plurality of different collection systems 40 at a plurality of different locations.

An evaluation system 10 may be used in a variety of contexts or environments where sensitive information (e.g., account numbers, usernames and associated passwords, Social Security numbers or similar identifiers, etc.) is used. In a specific embodiment, the evaluation system 10 is configured to scan for and identify potential credit card numbers and debit card numbers, which are collectively referred to herein as "payment card numbers." The scanning device 20 in such an embodiment may comprise a server under control of an approved scanning vendor (ASV), which is a party that has been authorized to access and evaluate the systems (i.e., the collection systems 40, such as card readers, associated computers, etc.) employed by one or more merchants to acquire information from a consumer's payment card.

Figure 5:
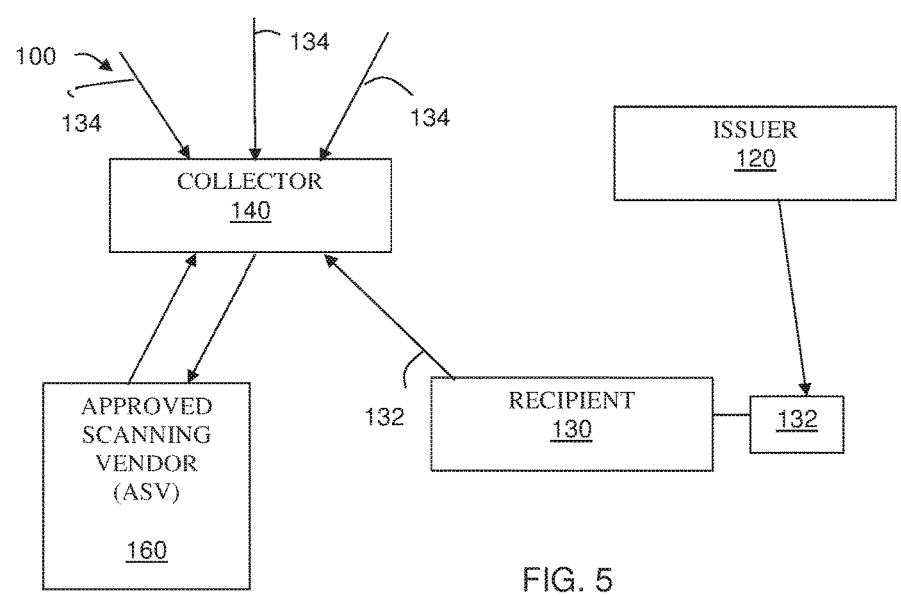
FIG. 5 is a diagram that illustrates an embodiment of a network in which sensitive information, such as identification numbers, may be collected and disseminated, and in which searches for sensitive information may be conducted.

The relationships between the various parties that may be involved in the collection and/or dissemination of sensitive information are illustrated by the schematic representation of FIG. 5. More specifically, FIG. 5 depicts a network 100 that includes an issuer 120 of sensitive information, a recipient 130 to whom the sensitive information is issued or assigned, and a collector 140 of sensitive information.

The issuer 120 may be a government entity, a healthcare institution (e.g., a hospital, etc.), a financial institution, or the like. As FIG. 5 schematically represents, there is a direct relationship between the issuer 120 and each of its recipients 130: the issuer 120 provides each of its consumers 130 with sensitive information in the form of an identification number 132. In so doing, the issuer 120 may determine whether or not each of its recipients 130 meets certain qualifications, such as citizenship or proper residency status, payment obligations, or other requirements for obtaining an identification number 132 (e.g., which may be printed on an identification card, as illustrated, etc.) or other sensitive information.

The recipient 130 may be an individual, a business, or any other entity. Each recipient 130 should assume responsibility for its identification number 132, as well as the information associated with the identification number 132.

Each collector 140 is a party that uses a recipient 130's identification number 132. A collector 140 may use a recipient 130's identification number 132 for any of a variety of reasons, including, without limitation, to gather information 134 (e.g., credit history, health history, criminal record, etc.) from any of a variety of outside sources about the recipient 130 that has been associated with that recipient 130's identification number 132, to determine whether or not the recipient 130 qualifies for certain services, or for any other suitable purpose.

Each collector 140 within the network 100 (i.e., each collector 140 that accepts an identification number 132 or other sensitive information from a recipient 130) may be liable to the recipients 130 for the misappropriation of their identification number 132 or other sensitive information, including, but not limited to, sensitive information associated with the recipient 130's identification number 132.

In order to ensure that the recipients 140 within the network 100 are adequately protecting sensitive information (e.g., identification numbers 132, etc.), the network 100 may also include one or more approved scanning vendors 160 (ASVs). An ASV 160 is an entity that has been authorized and/or certified to evaluate the systems (e.g., collection systems 40) that are used within the network 100 to collect and transmit information 134, and to determine whether or not those systems comply with accepted standards and/or relevant regulations or laws. Each ASV 160 may be employed by a regulatory body or organization, an issuer 120, or one or more collectors 140.

With returned reference to FIG. 4, an ASV 160 (FIG. 5) may use a scanning device 20 to verify whether or not a collector 140's (FIG. 5) collection systems 40 are compliant with accepted standards and/or relevant regulations or laws. Communication may be established between the processing element 22 of the scanning device 20 and various components of a collector 140's collection system 40, including, but not limited to, its memory 42. Communication between the processing element 22 and the collection system 40 may be direct or remote, and may be established by any suitable technique or protocol.

In determining whether or not a collector 140's (FIG. 5) collection system 40 is compliant, the processing element 22 of the ASV 160's (FIG. 5) scanning device 20 operates under control of one or more programs (e.g., computer programs, etc.) to evaluate certain aspects of the collection system 40. Various embodiments of programs that control operation of the processing element 22, as well as the processes that are effected by such programs in accordance with teachings of this disclosure, are described hereinafter.

In a specific embodiment, a process or program of this disclosure may cause the processing element 22 of a scanning device 20 to evaluate data 44 stored by one or more components (e.g., memory 42, etc.) of a collector 140's (FIG. 5) collection system 40 to determine whether the data 44 includes an identification number 132 (FIG. 5) or any information 134 (FIG. 5) that corresponds to an identification number 132. More specifically, a program of this disclosure may be capable of effecting a process in which data 44 is evaluated to determine whether it includes any data strings that are likely to comprise sensitive information such as identification numbers 132 or information 134 associated therewith.

Figure 1:
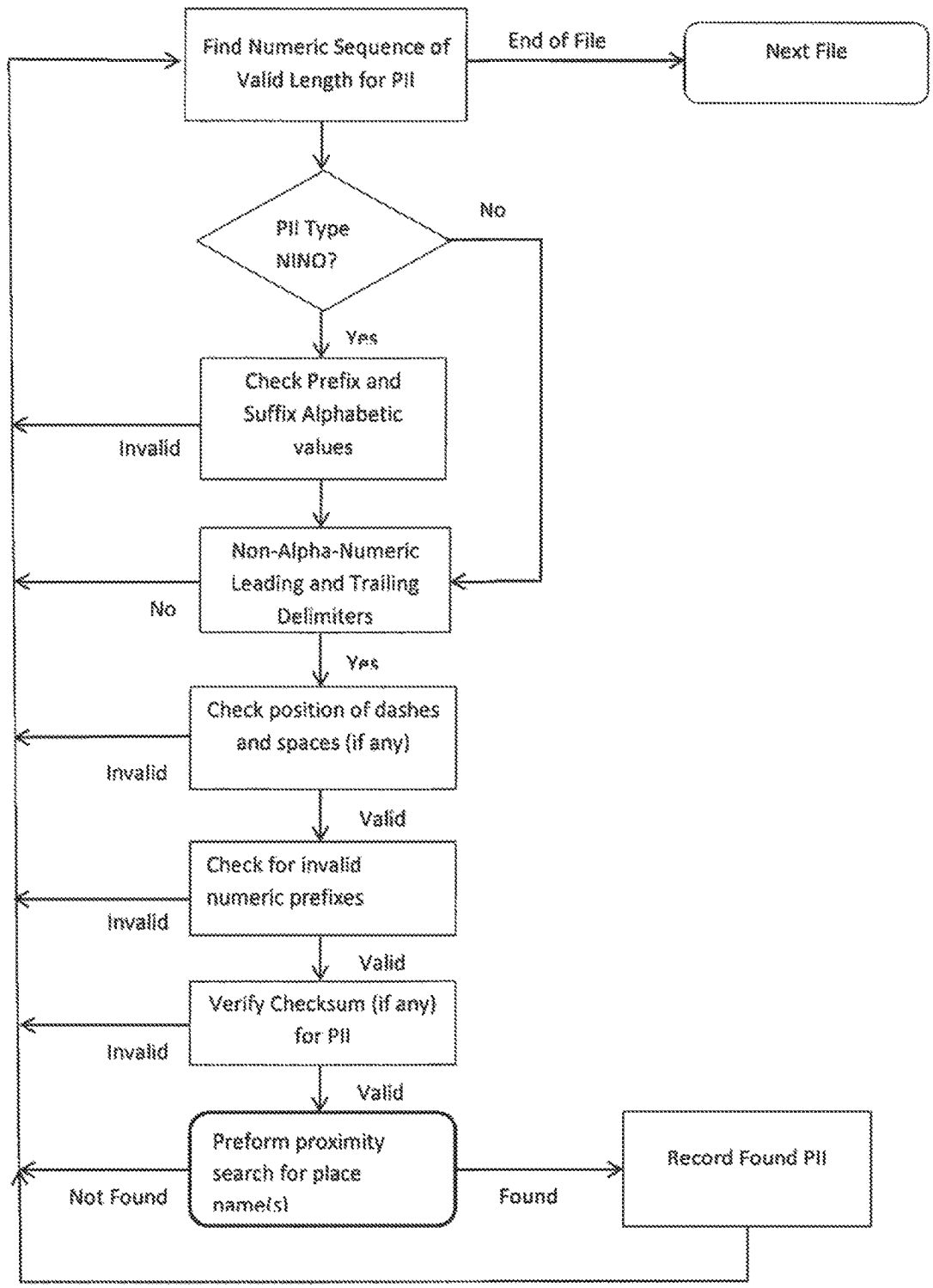
FIG. 1 is a flowchart showing an embodiment of a process for identifying a potential personal identification number, such as a U.S. Social Security Number (SSN) or Individual Taxpayer Identification Number (ITIN), a British National Insurance Number (NINO), a Canadian Social Insurance Number (SIN), or an Australian Tax File Number (TFN)

Searches for sensitive information may follow the process flow illustrated by the flowchart of FIG. 1. The search techniques disclosed by International Patent Application Publication WO/2011/150425, published on Dec. 1, 2011, and titled SYSTEMS AND METHODS FOR DETERMINING WHETHER DATA INCLUDES STRINGS THAT CORRESPOND TO SENSITIVE INFORMATION, the entire disclosure of which is hereby incorporated herein by reference, may be used to identify potentially sensitive information.

Such a search for potentially sensitive information may be supplemented with searching for place names. More specifically, once potentially sensitive information, such as a potential, or suspected, personal identification number (e.g., a SSN, an ITIN, a NINO, a SIN, a TFN, etc.) has been identified, a search may be conducted to determine whether or not a string of data includes a place name within a predetermined number of bytes (e.g., 256 bytes, 128 bytes, etc.) of, or in proximity to, the potential personal identification number.

Figure 2:
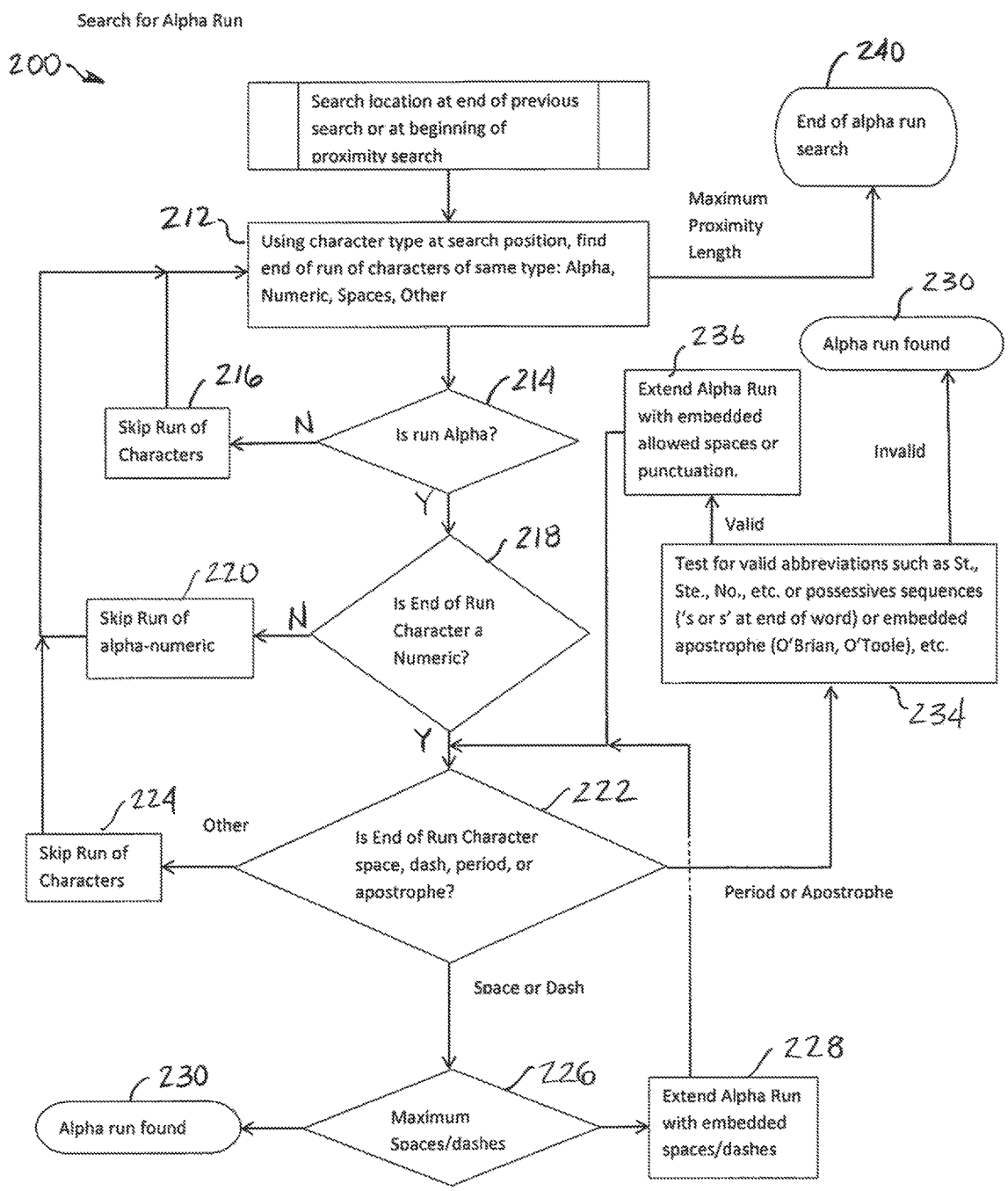
FIG. 2 is a flowchart illustrating an embodiment of process for determining whether or not any potential place names appear in a string of data.

Turning to FIG. 2, an embodiment of the process flow for a search for a place name may include a search for a consecutive string of letters, or alphabetical characters (e.g., English alphabet, optionally with old Gaelic characters; etc.). As indicated at reference 212, such a search may include identifying a series, or "run," of characters of the same type (e.g., letters, numbers, spaces, etc.). At reference 214, a determination is made as to whether or not the series of characters is alphabetic. If the series of characters is not alphabetic, as indicated at reference 216, the process flows back to reference 212, where another series of characters in the string of data may be evaluated. If, instead, the series of characters is a group of alphabetic characters, process flows to reference 218.

At reference 218, a type (e.g., letter, number, space, dash, apostrophe, etc.) of character of the byte immediately following the series (i.e., the "next" character) is identified. If the next character is numeric, as indicated at reference 220, the process flows back to reference 212, where another series of characters in the string of data may be evaluated. If the next character is not numeric, process flows to reference 222.

At reference 222, a determination is made as to whether or not the next character is a space, a dash, a period, or an apostrophe. If the next character is a space or a dash, process flows to reference character 226. If the next character is a period or an apostrophe, process flows to reference 234. If the next character is not a space, a dash, a period, or an apostrophe, as indicated at reference 224, the process flows back to reference 212, where another series of characters in the string of data may be evaluated.

At reference 226, a determination is made as to whether or not a total number of dashes and/or spaces in a series of groups of alphabetic characters exceeds a maximum allowable number of dashes and/or spaces in a place name. As an example, the maximum total number of dashes and/or spaces in a place name may be three (e.g., in the U.S., Canada, Australia, etc.) or four (e.g., in the United Kingdom, etc.). If the total number of dashes and/or spaces in a series of groups of alphabetic characters does not exceed the maximum allowable number of dashes and/or spaces, the process flows to reference 228, where the dash or space is considered to be a part of the series of alphabetic characters and the subsequent bytes are evaluated until a byte representing a non-alphabetic character is identified. From reference 228, the process may flow back to reference 222.

If, at reference 226, a determination is made that the next character exceeds the maximum allowable number of dashes and/or spaces in a place name, process flows to reference 230, where the sequence of alphabetic characters (and/or dashes, spaces, periods, and/or apostrophes) is tagged as a possible place name.

At reference character 234, a test is conducted to determine whether or not the character or characters represented by the series of bytes preceding the byte that corresponds to a period or apostrophe, along with the period or apostrophe, correspond to a valid abbreviation or name (e.g., St., Ste., No., N., W, S., E., O', etc.). In some embodiments, the series of alphabetic characters and the next character may be compared with a library of acceptable combinations. If the period or apostrophe is determined, at reference character 234, to be part of the series of alphabetic characters, the subsequent bytes are evaluated until a byte representing a non-alphabetic character is identified. From reference 234, the process may flow back to reference 222. If, instead, the period or apostrophe is not considered to be part of the series of alphabetic characters at reference 234, then process flows to reference character 230, where the series of bytes is considered to represent a possible place name, and may be tagged as such.

As noted at reference 240, when the search for place names extends a predetermined number of bytes (e.g., 256 bytes, 128 bytes, etc.), or a predetermined length, beyond the sequence of bytes that correspond to potentially sensitive information, the search for place names may be terminated.

Figure 3:
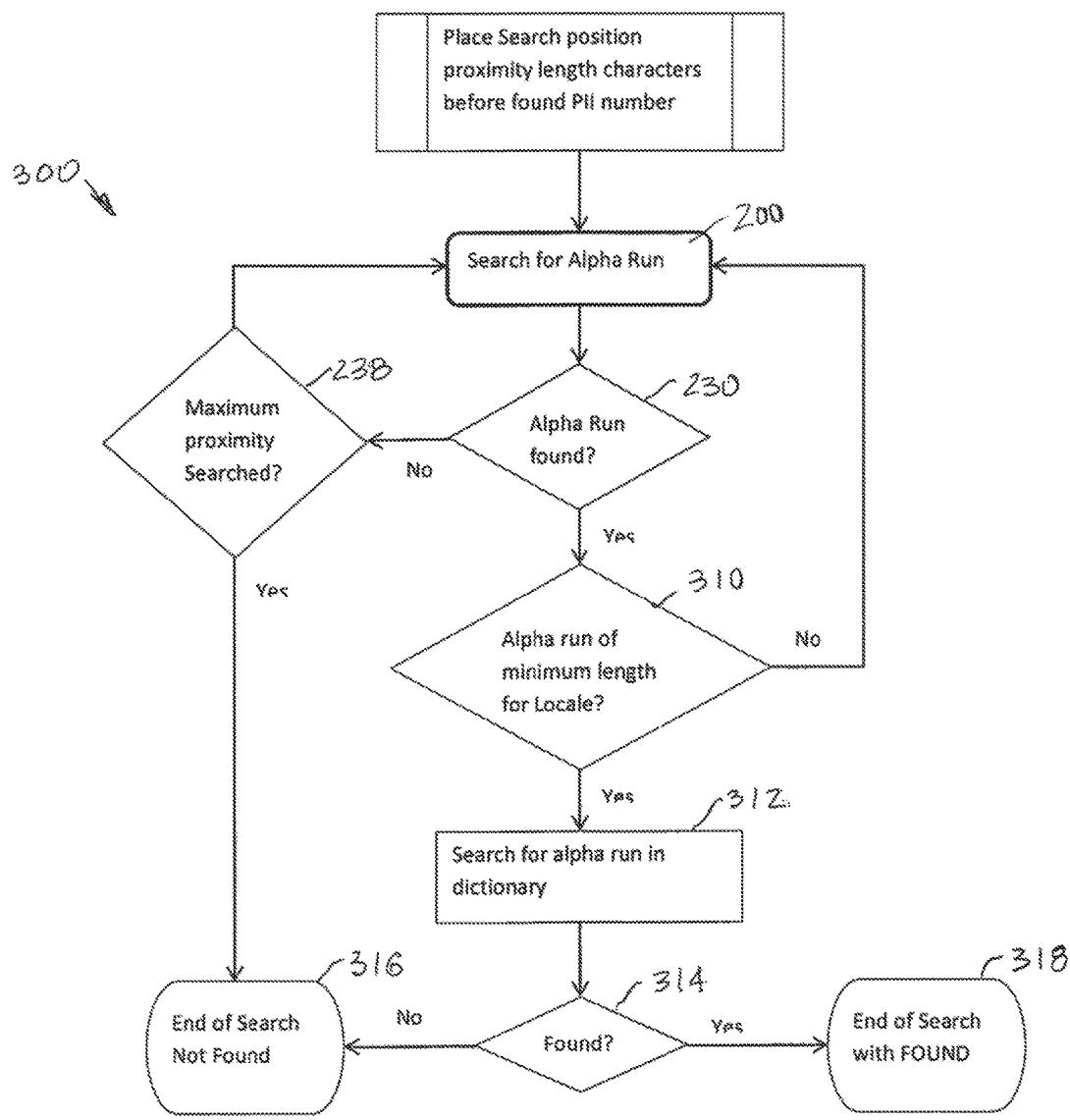
FIG. 3 is a flowchart depicting an embodiment of process flow for determining whether or not any potential place names are associated with and correspond to a particular type of a potential personal identification number.

With reference turned to FIG. 3, the context of the search for place names (at reference 200), such as the embodiment depicted in FIG. 2, is provided, as is an embodiment of the process flow once a possible place name has been identified at reference 230. Once a possible place name has been identified at reference 230, process flows to reference 310, where a determination is made as to whether or not the length (i.e., number of characters) of the possible place name meets a minimum length for a place name. The minimum length for the place name may be locale-specific. For example, a possible place name must have a minimum length of two characters to qualify as the name of or an abbreviation for a country, a state, or a province. As another example, a possible place name must have a minimum length of three characters to qualify as the name of or an abbreviation for a county or shire or for a township, a city, a town, or a village. If the possible place name does not meet the minimum length requirement, process flows back to reference 200, from which another possible place name may be revealed. If, instead, the possible place name does meet the minimum length requirement, process flows to reference 312.

At reference 312, a search for the possible place name in a dictionary, or library, of place names that correspond to the type of potentially sensitive information on which the place name search is based. At reference 314, a determination is made as to whether or not the possible place name matches a place name of the dictionary, or library. If the possible place name does not match a place name of the dictionary, or library, the process for a place name that corresponds to potentially sensitive information may be terminated, as indicated by reference 316. In some embodiments, with the lack of a corresponding place name, the potentially sensitive information may be considered not to comprise actual sensitive information. If the possible place name matches a place name of the dictionary, or library, then the process may flow to reference 318, where the search for a place name that corresponds to the potentially sensitive information may be terminated.

Alternatively, a search for at least one additional place name (e.g., a second place name, a third place name, etc.) may be conducted. The search for an additional place name may occur in situations where the sensitive nature of the potentially sensitive information (e.g., a personal identification number, etc.) cannot be verified, such as by use of a checksum algorithm. The search for an additional place name may be conducted by the same process used to identify the first place name. If an additional place name is identified and determined to be a valid place name for the jurisdiction of interest, a further analysis may be conducted to confirm that the additional place name, which may be referred to as a "secondary" place name, corresponds to the first place name, which may be referred to as a "primary" place name. In embodiments where the place names must correspond to one another, one of the place names may be the name of a locale (e.g., city, town, village, etc.), while the other place name may be the name of a larger geographic area (e.g., county, shire, state, province, country, etc.). In embodiments where no association between multiple place names is required, the place names could be equivalent to one another (e.g., each a locale, each a larger geographic area, etc.).

If a high enough level of confidence exists that potentially sensitive information is actually sensitive information, that information may be tagged. The tagging of such information may be used to notify a party responsible for the memory on which such information is stored of the suspected sensitive nature of such information. Alternatively, the tagging of such information may be used to automatically delete such information from the memory on which it was located.

A search for a personal identification number that comprises a U.S. Social Security Number or a U.S. Individual Taxpayer Identification Number (ITIN) comprises searching for a string of data that corresponds to the format of a Social Security Number or Individual Taxpayer Identification Number; i.e., DDDDDDDDD or DDD-DD-DDDD, where D represents a numeric digit. Accordingly, such a search may include a nine (9) byte interval scan for a numeric digit (i.e., a number from 0 to 9).

Each time a numeric digit is located during the interval scan, a sequential analysis may be made to determine whether or not the numeric digit is part of string of data that may correspond to a Social Security Number or an Individual Taxpayer Identification Number. More specifically, a sequential analysis may be conducted to determine whether or not the numeric digit is part of a sequence that includes nine (9) consecutive digits and/or whether or not the numeric digit is part of a sequence that includes three (3) consecutive digits, followed by a dash, followed by two (2) consecutive digits, followed by another dash, followed by four (4) consecutive digits.

If the numeric digit is part of a sequence that meets the format requirements for a Social Security Number or an International Taxpayer Identification Number, the first three (3) digits may then be evaluated to determine whether or not they correspond to a valid Social Security Number or Individual Taxpayer Identification Number; "000" and "666" do not correspond to valid Social Security Numbers or Individual Taxpayer Identification Numbers.

In some embodiments where a sequence meets the format requirements for a Social Security Number, a filter may be used to compare, or check, the sequence against allocation tables that were used to assign Social Security Numbers through Jun. 24, 2011. With such allocation tables, the first three digits of a Social Security Number were assigned based on a geographic area in which an individual who received the Social Security Number lived and, thus, could be cross-checked against any location information associated with the Social Security Number to determine whether or not the sequence under analysis could be a Social Security Number. Social Security Number allocation tables based the next two digits of a Social Security Number on a group with which the Social Security Number was assigned, or on a year in which the Social Security Number was assigned. Notably, since Jun. 25, 2015, Social Security Numbers have been randomly assigned.

If the sequential analysis and any further examination reveals a sequence that may correspond to a Social Security Number or an Individual Taxpayer Identification Number, a delimiter search may be conducted to confirm that the suspected Social Security Number or Individual Taxpayer Identification Number is preceded and followed by known delimiters.

Interval scanning, sequential analysis, and, optionally, delimiter searching that indicates that a particular series of bytes may comprise a Social Security Number or an Individual Taxpayer Identification Number may be followed by geographic location searching. The geographic location searching may include a search for two place names (e.g., a state name, a city name, etc.) that are located in sufficient proximity to one another in the string of data, that are located in sufficient proximity to the suspected Social Security Number or Individual Taxpayer Identification Number in the string of data, that correspond to each other, and that correspond to a place in the U.S.

A British (United Kingdom) National Insurance Number has the format CCDDDDDDC, where the CC at the beginning is a two letter combination (in which the first letter cannot be D, F, I, Q, U or V, the second letter cannot be O, and the combinations BG, GB, NK, KN, TN, NT and ZZ cannot be used), each D represents a numeric digit between 0 and 9, and the C at the end represents an A, a B, a C or a D. An interval scan for such a number may include a search for a numeric digit (i.e., a number from 0 to 9) conducted at a six (6) byte interval.

When a numeric digit is located during the interval scan, a sequential analysis may be conducted to determine whether or not the numeric digit is part of string of data that may correspond to a National Insurance Number. More specifically, a sequential analysis may be conducted to determine whether or not the numeric digit is part of a sequence that includes six (6) consecutive digits preceded by two alphabetical characters (i.e., A through Z) that correspond to a two letter code for a county or shire in the United Kingdom and followed by single alphabetical character that is an A, a B, a C, or a D.

If the sequential analysis reveals a sequence that may correspond to a National Insurance Number, a delimiter search may be conducted to confirm that the suspected National Insurance Number is preceded and followed by known delimiters.

Interval scanning, sequential analysis, and, optionally, delimiter searching that indicates that a particular series of bytes may comprise a National Insurance Number may be followed by geographic location searching. The geographic location searching may include a search for a place name (e.g., a county or shire name, a city name, etc.) located in sufficient proximity to the suspected National Insurance Number in the string of data and that correspond to a place in the U.K.

In Australia, Tax File Numbers are used as personal identification numbers. A Tax File Number has the format DDD-DDD-DDD, which each D represents a numeric digit (i.e., a number from 0 to 9). Thus, a search for an Australian Tax File Number may begin with a nine (9) byte interval scan, in which every ninth ($9^{th}$) byte of data of a string of data is scanned to determine whether or not it represents a numeric digit.

If the interval scan reveals a byte that represents a numeric digit, a sequential analysis may be made to determine whether or not the numeric digit is part of string of data that may correspond to a Tax File Number. More specifically, a sequential analysis may be conducted to determine whether or not the numeric digit is part of a sequence that includes nine (9) consecutive digits and/or whether or not the numeric digit is part of a sequence that includes three (3) consecutive digits, followed by a dash, followed by three (3) consecutive digits, followed by another dash, followed by three (3) consecutive digits.

If the sequential analysis and any further examination reveals a sequence that may correspond to a Tax File Number, a delimiter search may be conducted to confirm that the suspected Tax File Number is preceded and followed by known delimiters.

Interval scanning, sequential analysis, and, optionally, delimiter searching that indicates that a particular series of bytes may comprise a Tax File Number may be followed by an authentication process, in which a checksum algorithm is used to verify whether or not the nine (9) consecutive digits may correspond to an actual Tax Number. An example of a checksum algorithm for suspected Tax Numbers follows. In the example, each digit of a suspected Tax Number is multiplied by a corresponding weighting number:

1 2 3 4 5 6 7 8 2 (a potential TFN)
1 4 3 7 5 8 6 9 10 (the weighting numbers)
1 8 9 28 25 48 42 72 20.

The results are then added together. If that sum is divisible by 11, as it is in this example (i.e., 1+8+9+28+25+48+42+72+20=253; 253/11=23), then the sequence of digits may be a valid Tax File Number.

Interval scanning, sequential analysis, optional delimiter searching, and optional checksum validation that indicates that a particular series of bytes may comprise a Tax File Number may be followed by geographic location searching. The geographic location searching may include a search for a place name (e.g., a state name, a city name, etc.) located in sufficient proximity to the suspected Tax Number in the string of data and that corresponds to a place in Australia.

The personal identification numbers that are used in Canada—Social Insurance Numbers—have the format DDD-DDD-DDD, which each D represents a numeric digit (i.e., a number from 0 to 9). Thus, a search for a Canadian Social Insurance Number may begin with a nine (9) byte interval scan, in which every ninth ($9^{th}$) byte of data of a string of data is scanned to determine whether or not it represents a numeric digit.

If the interval scan reveals a byte that represents a numeric digit, a sequential analysis may be made to determine whether or not the numeric digit is part of string of data that may correspond to a Social Insurance Number. More specifically, a sequential analysis may be conducted to determine whether or not the numeric digit is part of a sequence that includes nine (9) consecutive digits and/or whether or not the numeric digit is part of a sequence that includes three (3) consecutive digits, followed by a dash, followed by three (3) consecutive digits, followed by another dash, followed by three (3) consecutive digits.

If the sequential analysis and any further examination reveals a sequence that may correspond to a Social Insurance Number, a delimiter search may be conducted to confirm that the suspected Social Insurance Number is preceded and followed by known delimiters.

Interval scanning, sequential analysis, and, optionally, delimiter searching that indicates that a particular series of bytes may comprise a Social Insurance Number may be followed by an authentication process, in which a checksum algorithm is used to verify whether or not the nine (9) consecutive digits may correspond to an actual Social Insurance Number. An example of a checksum algorithm for suspected Social Insurance Numbers follows. In the example, each digit of a suspected Social Insurance Number is multiplied by a corresponding weighting number:

046 454 286 (a potential SIN)
121212121(the weighting numbers)
086 858 276.

If the result, or product, of a particular function is two digits, then the digits are added together. In this example, in the second-to-last digit, since 2×8=16, the 1 and the 6 are added together to provide a 7. The results are then added together. If that sum is divisible by 10, as it is in this example (i.e., 0+8+6+8+5+8+2+7+6=50), then the sequence of digits may be a valid Social Insurance Number.

Interval scanning, sequential analysis, optional delimiter searching, and optional checksum validation that indicates that a particular series of bytes may comprise a Social Insurance Number may be followed by geographic location searching. The geographic location searching may include a search for a place name (e.g., a province name, a city name, etc.) located in sufficient proximity to the suspected Social Insurance Number in the string of data and that corresponds to a place in Canada.

Although the foregoing description provides many specifics, these should not be construed as limiting the scope of the any of the appended claims, but merely as providing information pertinent to some specific embodiments that may fall within the scopes of the appended claims. Features from different embodiments may be employed in combination. Other embodiments may also be devised which lie within the scopes of the appended claims. The scope of each claim is indicated and limited only by its plain language and the full scope of legal equivalents available thereto. All additions, deletions and modifications to the disclosed subject matter that fall within the meanings and scopes of the claims are to be embraced by the claims.

What is claimed:

1. A system for identifying potentially sensitive information, comprising:
  a scanning device configured to communicate with a memory device that stores data including potentially sensitive information, the scanning device programmed to:
    evaluate a plurality of intermittently spaced, evaluated bytes of the data;
    tag each evaluated byte of the plurality of intermittently spaced, evaluated bytes that corresponds to a decimal number or a dash to provide a tagged byte;
    sequentially evaluate and enumerate bytes preceding and following each tagged byte until a value of a preceding sequentially evaluated byte and a value of a following sequentially evaluated byte do not correspond to decimal numbers or dashes;
    determine whether a number of sequential enumerated bytes corresponds to a length of a sensitive data string;
    identify a string of sequential enumerated bytes that falls within the length of the sensitive data string as a suspected sensitive data string; and
    search for a place name within a predetermined number of bytes preceding the suspected sensitive data string and a predetermined number of bytes following the suspected sensitive data string.

2. The system of claim 1, wherein the scanning device is programmed to scan every n-th byte of at least a portion of the data.

3. The system of claim 2, wherein n is a possible length of the sensitive data string.

4. The system of claim 3, wherein the sensitive data string comprises a personal identification number.

5. The system of claim 4, wherein n is six, eight, nine, or eleven.

6. The system of claim 1, wherein the scanning device is further programmed to:
  sequentially evaluate and enumerate bytes preceding and following each suspected sensitive data string until a value of a preceding sequentially evaluated byte and a value of a following sequentially evaluated byte do not correspond to a letter of an alphabet.

7. The system of claim 6, wherein the scanning device is further programmed to:
  determine whether a number of sequential enumerated bytes corresponding to a letter of the alphabet preceding the suspected sensitive data string and/or following the suspected sensitive data string correspond to numbers and locations of letters of the alphabet expected to be a part of the potentially sensitive information; and
  if the number of sequential enumerated bytes corresponding to a letter of the alphabet preceding the suspected sensitive data string and/or following the suspected sensitive data string correspond to numbers and locations of letters of the alphabet expected to be a part of the potentially sensitive information, including the sequential enumerated bytes corresponding to a letter of the alphabet in the suspected sensitive data string.

8. The system of claim 7, wherein the scanning device is further programmed to:
  determine whether values of sequential enumerated bytes corresponding to a letter of the alphabet preceding the suspected sensitive data string correspond to acceptable values for letters expected to be at a same location in the suspected sensitive data string; and if values of sequential enumerated bytes corresponding to a letter of the alphabet preceding the suspected sensitive data string correspond to acceptable values for letters expected to be at a same location in the suspected sensitive data string, including the sequential enumerated bytes corresponding to a letter of the alphabet in the suspected sensitive data string.

9. The system of claim 1, wherein the scanning device is programmed to search for a place name within a predetermined number of bytes preceding the suspected sensitive data string and a predetermined number of bytes following the suspected sensitive data string by:

identifying at least one potential place name within the predetermined number of bytes; and confirming that the at least one potential place name corresponds to a library of acceptable place names.

10. The system of claim 9, wherein the scanning device is programmed to search for at least two place names within the predetermined number of bytes preceding the suspected sensitive data string and the predetermined number of bytes following the suspected sensitive data string.

11. The system of claim 10, wherein the scanning device is further programmed to:

confirm that the at least two place names correspond to one another.

* * * * *